United States Patent
Ito

(10) Patent No.: US 8,238,009 B2
(45) Date of Patent: Aug. 7, 2012

(54) DRIVE SIGNAL GENERATOR AND OPTICAL SCANNING DEVICE PROVIDED WITH DRIVE SIGNAL GENERATOR, AND IMAGE DISPLAY DEVICE

(75) Inventor: Kunihiro Ito, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 34 days.

(21) Appl. No.: 13/005,915

(22) Filed: Jan. 13, 2011

(65) Prior Publication Data

US 2011/0109950 A1 May 12, 2011

Related U.S. Application Data

(63) Continuation-in-part of application No. PCT/JP2009/056238, filed on Mar. 27, 2009.

(30) Foreign Application Priority Data

Jul. 16, 2008 (JP) .................................. 2008-185218

(51) Int. Cl.
G02B 26/08 (2006.01)
(52) U.S. Cl. ............... 359/198.1; 359/199.1; 359/199.3; 359/199.4; 359/201.1
(58) Field of Classification Search .... 359/198.1–200.8, 359/221.2; 318/119, 127–128; 347/225, 347/232–237, 247–250; 361/139, 152, 182, 361/187, 274.1; 310/36, 40 R, 48, 66, 68 R, 310/73, 309, 311
See application file for complete search history.

(56) References Cited

U.S. PATENT DOCUMENTS

| | | | |
|---|---|---|---|
| 6,188,191 B1 | 2/2001 | Frees et al. | |
| 6,853,532 B2 * | 2/2005 | Miyajima et al. | ............. 361/187 |
| 2004/0037490 A1 | 2/2004 | Tochio et al. | |
| 2004/0227984 A1 | 11/2004 | Yamabana et al. | |
| 2008/0204839 A1 | 8/2008 | Murakami et al. | |
| 2008/0266627 A1 * | 10/2008 | Brown et al. | ................. 359/198 |

FOREIGN PATENT DOCUMENTS

JP A-10-10449 1/1998

(Continued)

OTHER PUBLICATIONS

International Search Report for International Patent Application No. PCT/JP2009/056238, mailed on Jul. 7, 2009 (w/ English translation).

Primary Examiner — James Phan
(74) Attorney, Agent, or Firm — Oliff & Berridge, PLC

(57) ABSTRACT

A drive signal generator includes: a first storage part which stores data related to a primary processing signal acquired by subjecting a linearly changing saw-tooth signal to the low-pass filter processing; a parameter decision part which decides a parameter for the notch filter processing; a filter part which generates a secondary processing signal by subjecting the primary processing signal read from the first storage unit to the notch filter processing using the decided parameter decided by the parameter decision part; a second storage part which stores data related to the secondary processing signal generated by the filter unit; and a drive signal generation part which reads the data related to the secondary processing signal with a clock having a predetermined frequency and generates the drive signal by subjecting the data related to the secondary processing signal to analog conversion.

9 Claims, 7 Drawing Sheets

FOREIGN PATENT DOCUMENTS

| | | |
|---|---|---|
| JP | A-2001-5501 | 1/2001 |
| JP | A-2003-29192 | 1/2003 |
| JP | A-2004-85596 | 3/2004 |
| JP | A-2004-361920 | 12/2004 |
| JP | A-2006-93989 | 4/2006 |
| JP | A-2006-276399 | 10/2006 |
| WO | WO 2006/104084 A1 | 10/2006 |

* cited by examiner

DRIVE SIGNAL S1

SAW-TOOTH SIGNAL S10

18TH-ORDER LOW-PASS FILTER

PRIMARY PROCESSING SIGNAL S11

PRIMARY PROCESSING
SIGNAL S11

SECOND-ORDER LOW-PASS FILTER

+

$$\frac{S^2+(\omega/Q)S+\omega^2}{\omega^2}$$

SECOND-ORDER NOTCH FILTER

SECONDARY PROCESSING
SIGNAL S12

DRIVE SIGNAL GENERATOR AND OPTICAL SCANNING DEVICE PROVIDED WITH DRIVE SIGNAL GENERATOR, AND IMAGE DISPLAY DEVICE

CROSS-REFERENCE TO RELATED APPLICATIONS

The present application is a Continuation-in-Part of International Application PCT/JP2009/056238 filed on Mar. 27, 2009, which claims the benefits of Japanese Patent Application No. 2008-185218 filed Jul. 16, 2008.

TECHNICAL FIELD

The present invention relates to a drive signal generator and an optical scanning device provided with the drive signal generator, and an image display device, and more particularly to a drive signal generator which generates a drive signal for forcibly driving a reflection mirror of an optical scanning element in a non-resonance mode, a drive signal being generated by subjecting a saw-tooth signal to low-pass filter processing and notch filter processing, and an optical scanning device provided with the drive signal generator, and an image display device.

Conventionally, there has been known an optical scanning device which scans light using an optical scanning element such as a Galvano mirror.

For example, there has been known an optical scanning image display device which displays an image by scanning light generated based on an image signal (hereinafter referred to as "image light") two-dimensionally by an optical scanning device.

In this type of optical scanning image display device, an image is displayed by horizontally scanning the image light by a reflection mirror of a first optical scanning element and by vertically scanning the image light by a reflection mirror of a second optical scanning element.

For example, in an image display device disclosed in JP-A-2006-276399, an image light is scanned in the horizontal direction in a reciprocating manner by swinging a reflection mirror of a first optical scanning element in a resonance mode, and the image light is scanned in the vertical direction by forcibly driving a reflection mirror of a second optical scanning element in a non-resonance mode in a saw-tooth shape.

Although the scanning of the image light in the vertical direction is performed by forcibly driving the reflection mirror of the optical scanning element in a saw-tooth shape, for every cycle, the reflection mirror is linearly changed from a minimum position to a maximum position and, thereafter, the reflection mirror returns to the minimum position. Since the return of the reflection mirror to the minimum position is performed in a short period compared to a period in which the reflection mirror is changed to the maximum position from the minimum position and hence, a reaction to the reflection mirror occurs in such a return.

The reflection mirror of the optical scanning element is swingably supported on a fixed member by way of a resilient beam member and hence, there exists an intrinsic resonance frequency which is decided based on the reflection mirror and the beam member. Accordingly, when the frequency attributed to the above-mentioned reaction contains resonance frequency intrinsic to the optical scanning element, the reflection mirror generates the resonance oscillations. High frequency components are superimposed to swinging of the reflection mirror due to such resonance oscillations thus giving rise to a situation where optical scanning cannot be performed properly.

In view of such circumstance, in the conventional optical scanning device and image display device, the resonance oscillations are suppressed by generating a drive signal which forcibly drives a reflection mirror of an optical scanning element in a non-resonance mode, and is generated by subjecting a saw-tooth signal to low-pass filter processing and notch filter processing as described in JP-A-2004-361920.

However, it is necessary to perform the low-pass filter processing and notch filter processing corresponding to the resonance characteristic intrinsic to the optical scanning element and hence, depending on a filter characteristic, there exists a possibility that the low-pass filter processing and notch filter processing require a huge amount of arithmetic operation time. For example, when the 20th-order low-path filter calculation is performed in the low-pass filter processing and the second-order notch filter calculation is performed in the notch filter processing, a huge amount of calculation becomes necessary for performing the low-pass filter processing.

Therefore, it is difficult to rapidly generate a drive signal which is subjected to filter processing at the time of driving an optical scanning element.

Accordingly, it is an object of the present invention to provide a drive signal generator which can shorten a generation processing time of a drive signal which forcibly drives a reflection mirror of an optical scanning element in a non-resonance mode, and is generated by subjecting a saw-tooth signal to low-pass filter processing and notch filter processing and an optical scanning device provided with the drive signal generator, and an image display device.

To achieve the above-mentioned object, according to one aspect of the present invention, there is provided a drive signal generator for generating a drive signal which is used for forcibly driving a reflection mirror of an optical scanning element in a non-resonance mode, and is generated by subjecting a saw-tooth signal to low-pass filter processing and notch filter processing, the drive signal generator including: a first storage unit which stores data related to a primary processing signal acquired by subjecting the saw-tooth signal to the low-pass filter processing; a parameter decision unit which decides a parameter for the notch filter processing; a filter unit which reads the primary processing signal from the first storage unit and generates a secondary processing signal by subjecting the primary processing signal to the notch filter processing using the decided parameter; a second storage unit which stores data related to the secondary processing signal generated by the filter unit; and a drive signal generation unit which reads the data related to the secondary processing signal from the second storage unit by a clock having a predetermined frequency and generates the drive signal by subjecting the data related to the secondary processing signal to analogue conversion.

To achieve the above-mentioned object, according to another aspect of the present invention, there is provided an optical scanning device which includes the above-mentioned drive signal generator, the above-mentioned optical scanning element, and a second optical scanning element which scans light in a direction intersecting with the scanning direction of the optical scanning element.

To achieve the above-mentioned object, according to another aspect of the present invention, there is provided an image display device which includes a light irradiation part which irradiates an image light modulated corresponding to an image signal, and the above-mentioned optical scanning device, wherein an image is displayed by scanning the image light irradiated from the light irradiation part by the optical scanning device.

DESCRIPTION

Hereinafter, preferred embodiments of the present invention are explained in conjunction with drawings. In the embodiments described hereinafter, an example in which a drive signal generator of the present invention is applied to an optical scanning device, and an example in which the drive signal generator of the present invention is applied to an image display device are explained.

[1. Optical Scanning Device]

Firstly, an example in which the drive signal generator of the present invention is applied to the optical scanning device is explained.

Figure 1:
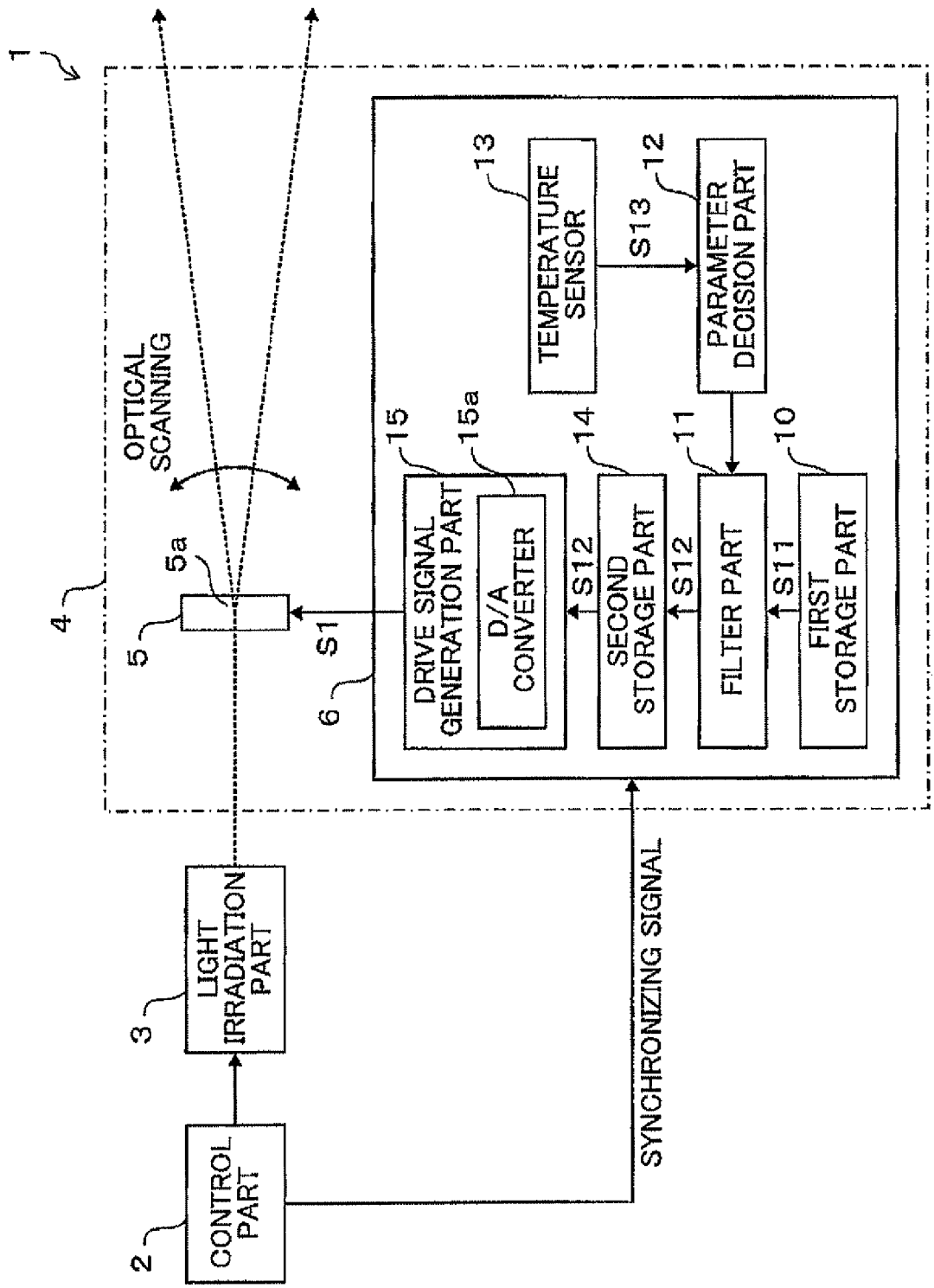
FIG. 1 is an explanatory view showing the constitution of an optical scanning device.

As shown in FIG. 1, an optical scanning device 1 includes a control part 2 which controls the whole optical scanning device 1, a light irradiation part 3 which irradiates light corresponding to a video signal S in accordance with a control performed by the control part 2, and an optical scanning part 4 which scans light irradiated from the light irradiation part 3.

The optical scanning part 4 includes an optical scanning element 5 such as a galvanometer mirror, a drive signal generator 6 which generates a drive signal for driving the optical scanning element 5 and the like. The optical scanning part 4 is operated in response to control signals (synchronization signal, ON/OFF signal and the like) which are inputted to the optical scanning part 4 from the control part 2. Here, provided that a reflection mirror of the optical scanning element 5 can be forcibly swung (rotated) for scanning light in a non-resonance mode, the optical scanning element 5 may be driven by a driving method of any type such as piezoelectric driving, electromagnetic driving or electrostatic driving.

Figure 2:
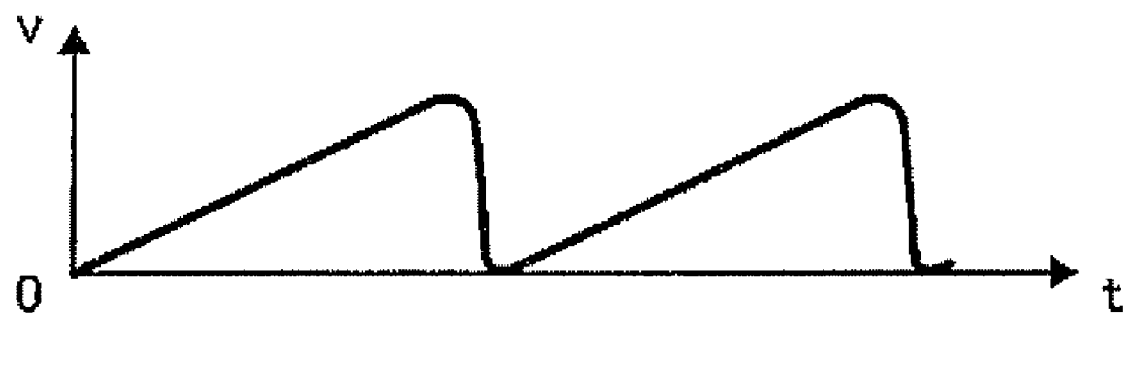
FIG. 2 is a graph showing a waveform of a drive signal which a drive signal generator of the optical scanning device outputs.

The drive signal generator 6 is provided for generating a drive signal S1 (see FIG. 2) which is a drive signal for forcibly driving a reflection mirror 5a of the optical scanning element 5 in a non-resonance mode and is acquired by subjecting a saw-tooth signal which changes linearly to low-pass filter processing and notch filter processing, and the drive signal generator 6 has the following constitution. In this embodiment, Bessel low-pass filter processing is used as the low-pass filter processing applied to the saw-tooth signal. Further, the saw-tooth signal which changes linearly shifts a voltage value thereof from a maximum level to a minimum level within a sufficiently short period compared to a period in which the saw-tooth signal shifts the voltage value from the minimum level to the maximum level. Although low-pass filter processing is explained by taking Bessel low-pass filter processing which exhibits a favorable phase characteristic and a favorable group delay characteristic as an example in this embodiment, it is possible to use a filter having other characteristic such as a Butterworth characteristic as the low-pass filter. The notch filter is also referred to as a band elimination filter (BEF).

The drive signal generator 6 includes, as shown in FIG. 1, a first storage part 10 (one example of a first storage unit), a filter part 11 (one example of a filter unit), a parameter decision part 12 (one example of a parameter decision unit), a temperature sensor 13 (one example of a temperature detection unit), a second storage part 14 (one example of a second storage unit), and a drive signal generation part 15 (one example of a drive signal generation unit).

Figure 3A:
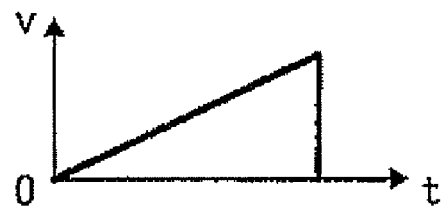
FIG. 3A is a graph for explaining a method of generating a drive signal.
Figure 3B:
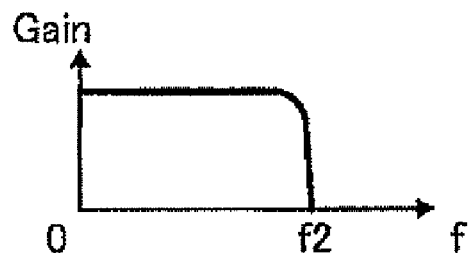
FIG. 3B is a graph for explaining the method of generating the drive signal.
Figure 3C:
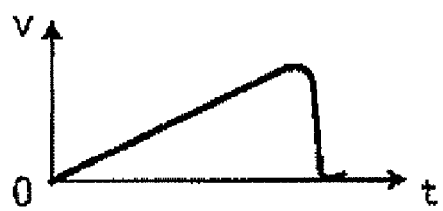
FIG. 3C is a graph for explaining the method of generating the drive signal.

In the first storage part 10, data related to a primary processing signal S11 which is acquired by subjecting a saw-tooth signal S10 which changes linearly to low-pass filter processing is prestored. For example, as shown in FIG. 3A to FIG. 3C, the primary processing signal S11 is generated by subjecting the saw-tooth signal S10 which changes linearly (see FIG. 3A) to the filter processing using a 18th-order low-pass filter, and the primary processing signal S11 is sampled at a predetermined sampling frequency, and is subjected to A/D conversion, and data obtained by the A/D conversion is prestored in the first storage part 10 as data related to the primary processing signal S11.

For example, as resonance characteristics intrinsic to the optical scanning element 5, assume that the first-order resonance is f1 [Hz], and second- and higher-order resonances are f2 [Hz] or more. In this case, by attenuating frequencies equal to or higher than f2(>f1) [Hz] in the low-pass filter processing, it is possible to suppress the influence exerted on a drive signal by the secondary and higher-order resonances among the resonance characteristics intrinsic to the optical scanning element 5.

Figure 4A:
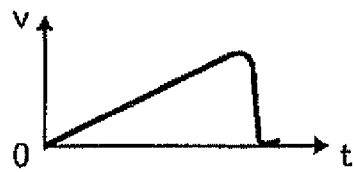
FIG. 4A is a graph for explaining a method of generating a drive signal.
Figure 4B:
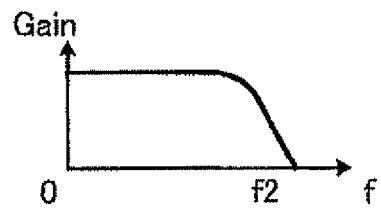
FIG. 4B is a graph for explaining the method of generating the drive signal.
Figure 4B:
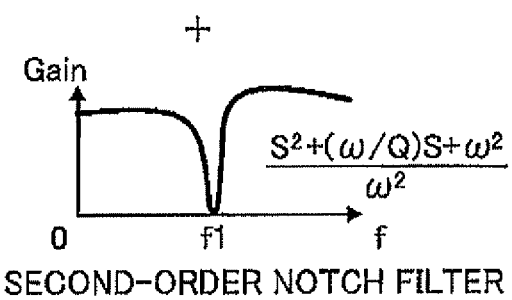
Figure 4C:
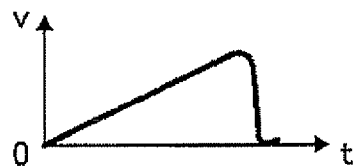
FIG. 4C is a graph for explaining the method of generating the drive signal.

The filter part 11, as shown in FIG. 4A to FIG. 4C, reads the data related to the primary processing signal S11 stored in the first storage part 10, and generates a secondary processing signal S12 by subjecting the primary processing signal S11 to notch filter processing with a predetermined parameter.

For example, as resonance characteristics intrinsic to the optical scanning element 5, assume that the first-order resonance is f1 [Hz] and second- and higher-order resonances are f2 [Hz] or more. In this case, in the notch filter processing, by attenuating frequencies within a band around frequency (f1 [Hz]), it is possible to suppress the influence exerted on a drive signal by the first-order resonance out of the resonance characteristics intrinsic to the optical scanning element 5.

The filter processing using the second-order notch filter is realized by calculation using a following formula 1. The notch filter processing cannot be realized unless the order of numerator is equal to or more than the order of denominator. Accordingly, in the filter part 11, as shown in FIG. 4B, in addition to the second-order band-pass filter processing, second-order low-pass filter processing is performed. Accordingly, the secondary processing signal S12 becomes a signal acquired by subjecting the saw-tooth signal S10 to the 20th-order low-pass filter and the second-order notch filter processing.

$$(S^2+(\omega/Q)S+\omega^2)/\omega^2 \quad \text{(formula 1)}$$

In this manner, the first-order resonance of the optical scanning element 5 is suppressed by the second-order notch filter processing and hence, linearity of the drive signal S1 can be enhanced compared to a case where a cutoff frequency of the low-pass filter is set to f1 [Hz] or below.

Here, the parameter used by the filter part 11 is decided by the parameter decision part 12, and is inputted to the filter part 11. The parameter decision part 12 decides the parameter used in the filter part 11 based on temperature detection information S13 outputted from the temperature sensor 13 arranged in the vicinity of a reflection mirror of the optical scanning element 5. By deciding the parameter used in the filter part 11 in this manner, it is possible to perform filter processing in accordance with resonance characteristics (the frequency f1 of the first-order resonance and the frequency f2 of the second-order resonance) intrinsic to the optical scanning element 5 which change corresponding to a temperature of the optical scanning element 5.

In this embodiment, the parameter decision part 12 stores a table where a temperature and frequencies f1', f2' are associated with each other in an internal storage part (one example of a third storage part), and decides the frequencies f1' f2' based on a temperature detected by the temperature sensor 13 using this table. The frequency f1' is the center frequency of the notch filter corresponding to the first-order resonance frequency f1, and the frequency f2' is the cutoff frequency of the low-pass filter corresponding to the second-order resonance frequency f2. These frequencies f1', f2' are decided as parameters inputted to the filter part 11. Provided that the parameters can change the characteristic of the notch filter or the low-pass filter, the parameters are not always necessary to be information on the frequencies f1', f2', and may be other information.

The filter part 11, after generating the secondary processing signal S12 by subjecting the primary processing signal S11 to the notch filter processing and the low-pass filter processing as described above, stores the data related to the secondary processing signal S12 in the secondary storage part 14.

A drive signal generation part 15 reads the data related to the secondary processing signal S12 from the secondary storage part 14 by a clock CLK having a predetermined frequency, and generates a drive signal S1 by subjecting the data related to the secondary processing signal S12 to analogue conversion using an internal D/A convertor 15a. The drive signal generation part 15 inputs the generated drive signal S1 to the optical scanning element 5 so that the reflection mirror of the optical scanning element 5 is forcibly driven in a non-resonance mode.

Then, the optical scanning device 1 scans light irradiated from the light irradiation part 3 corresponding to a video signal S by the reflection mirror of the optical scanning element 5. The drive signal generation part 15 is configured to output a plurality of saw-tooth-shaped drive signals S1 by continuously repeating the processing in which the data related to the primary processing signal S11 is read from the first storage part 10 and the drive signal S1 is generated based on the data. Accordingly, light irradiated from the light irradiation part 3 is continuously and repeatedly scanned in the predetermined direction.

In this manner, the optical scanning device 1 of this embodiment includes the drive signal generator 6 which generates the drive signal S1 which forcibly drives the reflection mirror of the optical scanning element 5 in a non-resonance mode and is generated by subjecting the saw-tooth signal S10 to the low-pass filter processing and the notch filter processing.

Then, the drive signal generator 6 prestores the data related to the primary processing signal S11 acquired by subjecting the saw-tooth signal S10 to the low-pass filter processing in the first storage part 10, and generates the secondary processing signal S12 by subjecting the primary processing signal S11 to the notch filter processing.

Accordingly, it is possible to reduce a calculation time in the low-pass filter processing by the drive signal generator 6. Particularly, it is possible to reduce a huge amount of calculation time which becomes necessary at the time of performing the high-order low-pass filter processing (for example, the above-mentioned 20th-order low-pass filter processing).

Further, the filter part 11 generates a secondary processing signal S12 by performing the notch filter processing using a parameter decided by the parameter decision part 12. Accordingly, the notch filter processing in which the necessity of changing a parameter is high compared to the low-pass filter processing can be performed using a parameter which is changed when necessary. Further, by using a parameter corresponding to a resonance characteristic intrinsic to the optical scanning element 5 as the parameter which the parameter decision part 12 decides, even when there are the individual differences among resonance frequencies intrinsic to the optical scanning elements 5, the notch filter processing can be performed corresponding to the individual differences among resonance frequencies.

By performing the notch filter processing by the filter part 11 in this manner, it is possible to realize the reduction of storage capacity of the first storage part 10. That is, when the data to which the low-pass filter processing and the notch filter processing are applied is prestored in a storage unit, it is necessary to prepare data to which notch filter processing is applied with different parameters. However, according to this embodiment, since the notch filter processing is performed at the time of generating the drive signal S1, it is possible to reduce an amount of data to be stored in the storage unit.

Further, by allowing the parameter decision part 12 to detect the resonance characteristic intrinsic to the optical scanning element 5 and to decide the parameter, an operation which becomes necessary at the time of exchanging the optical scanning element 5 such as a repair or at the time of manufacturing the optical scanning device 1 or the like can be easily performed.

For example, a resonance detection signal generation part which supplies a sinusoidal signal to the optical scanning element 5 while changing a frequency of the sinusoidal signal is provided to the drive signal generator 6. Then, the resonance detection signal generation part outputs the sinusoidal signal to the optical scanning element 5 while changing the frequency of the sinusoidal signal, and detects resonance frequencies f1, f2 by detecting a swing state of the reflection mirror of the optical scanning element 5 by the parameter decision part 12. Here, the swing state of the reflection mirror is detected in such a manner that, for example, the displacement of a beam member which drives the reflection mirror is detected by a piezoelectric element or the like, and a voltage generated by the piezoelectric element is detected by the parameter detection part 12 whereby the swing state of the reflection mirror is detected so that a parameter is decided.

Further, the resonance characteristic intrinsic to the optical scanning element 5 changes corresponding to the temperature and hence, there is provided a table in which the temperature and the resonance characteristic are associated with each other. Accordingly, the resonance characteristic intrinsic to the optical scanning element 5 is detected in such a manner that temperature detection is performed by the temperature sensor 13, and the resonance characteristic is detected by performing the conversion on the table based on the detected temperature. Accordingly, even when the temperature changes, it is possible to properly perform the optical scanning.

Next, an example in which the drive signal generator according to the present invention is applied to the image display device is explained. Here, the explanation is made by taking a retinal scanning display as one example of the image display device. The retinal scanning display is an image display device which projects a scanned image light onto a retina of at least one eye of a user thus allowing the user to visually recognize an image.

Figure 5:
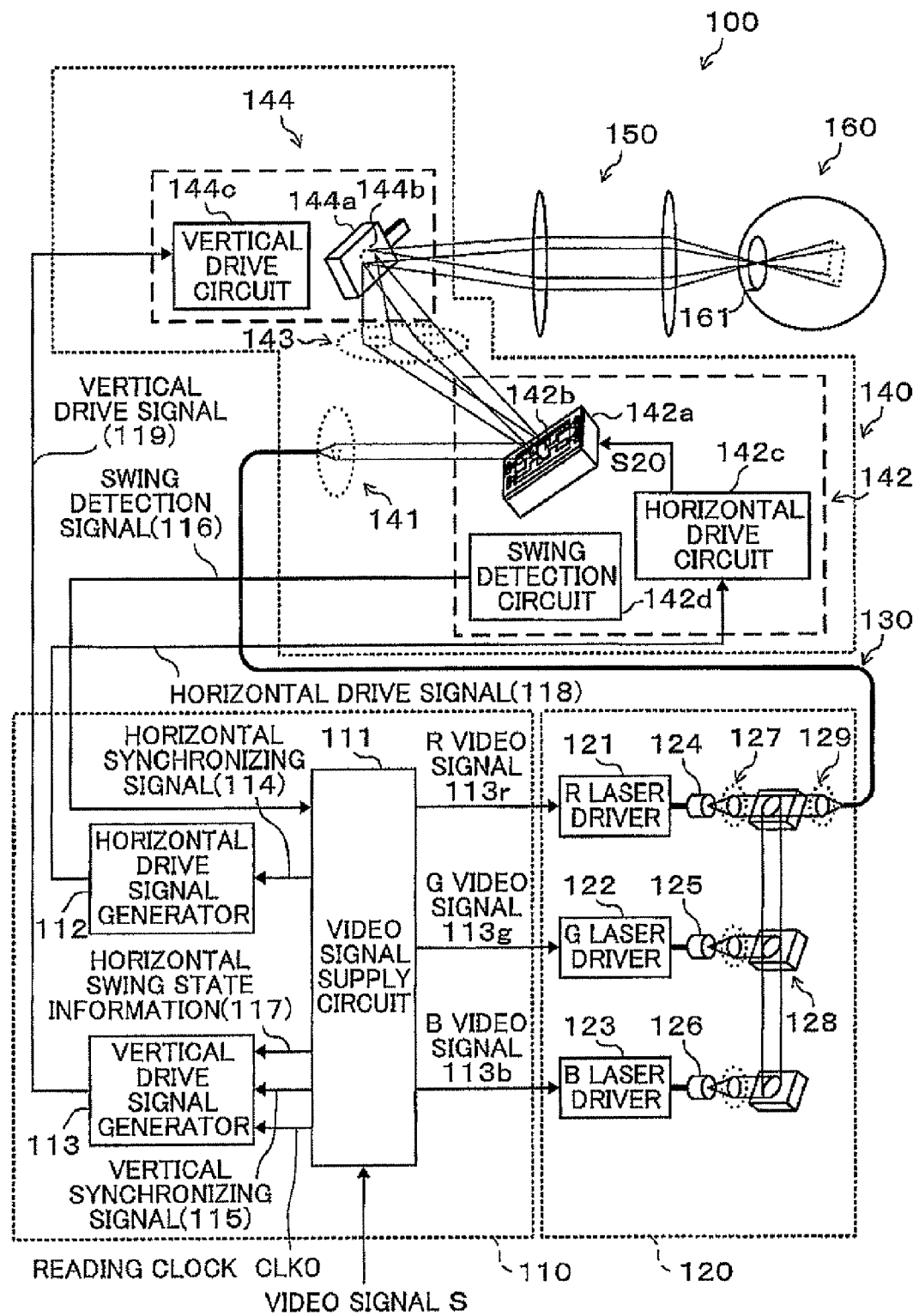
FIG. 5 is an explanatory view showing the constitution of a retinal scanning display.

As shown in FIG. 5, a retinal scanning display 100 includes a control part 110, a light irradiation part 120, an optical fiber 130, an optical scanning part 140 and a projection optical system 150. Here, the control part 110 and the optical scanning part 140 correspond to the optical scanning device 1. The retinal scanning display 100 scans the image light irradiated from the light irradiation part 120 by the optical scanning part 140 and displays the scanned image light as an image.

The control part 110 includes a video signal supply circuit 111 to which a video signal S is inputted from the outside and which generates respective signals which become elements for synthesizing an image in response to the inputted video signals S, a horizontal drive signal generator 112 (one example of second drive unit), and a vertical drive signal generator 113 (one example of drive signal generator). The video signal supply circuit 111 outputs video signals 113*r*, 113*g*, 113*b*, a horizontal synchronizing signal 114, a vertical synchronizing signal 115, horizontal swing state information 117, a reading clock CLK0, and the like. The horizontal drive signal generator 112 generates a horizontal drive signal 118 in synchronism with the horizontal synchronizing signal 114 outputted from the video signal supply circuit 111, and the horizontal drive signal 118 is inputted to a horizontal drive circuit 142*c*. The vertical drive signal generator 113 generates a vertical drive signal 119 (one example of a drive signal) in synchronism with the vertical synchronizing signal 115 outputted from the video signal supply circuit 111, and the vertical drive signal 119 is inputted to a vertical drive circuit 144*c*.

The light irradiation part 120 includes an R laser 124, a G laser 125 and a B laser 126 for irradiating laser beams whose intensities are respectively modulated in response to the respective video signals 113*r*, 113*g*, 113*b* of red (R), green (G) and blue (B) outputted from the video signal supply circuit 111. The light irradiation part 120 further includes an R laser driver 121, a G laser driver 122 and a B laser driver 123 for driving these lasers 124, 125, 126 respectively. Still further, the light irradiation part 120 includes collimation optical systems 127 provided for collimating laser beams irradiated from the respective lasers 124 to 126, dichroic mirrors 128 which synthesize collimated laser beams and a coupling optical system 129 which guides the synthesized laser beams to an optical fiber 130. Here, the laser beam which is generated by the light irradiation part 120 and is incident on the optical fiber 130 in this manner is a light which is used for forming an image and hence, such a laser beam is referred to as "image light" hereinafter.

The image light which is guided to the optical fiber 130 from the light irradiation part 120 is incident on the optical scanning part 140. The optical scanning part 140 includes a collimation optical system 141 which collimates the image light irradiated from the optical fiber 130, a horizontal scanning part 142 which scans the collimated image light in the horizontal direction, a relay optical system 143 which guides the image light scanned in the horizontal direction to a vertical scanning part 144 described later, and the vertical scanning part 144 which scans the image light incident on the vertical scanning part 144 via the relay optical system 143 in the vertical direction which perpendicularly intersects with the horizontal direction. Further, the image light scanned by the optical scanning part 140 in this manner is incident on a pupil 161 of an eye 160 of a user by way of a projection optical system 150 having a relay optical system.

Here, the horizontal scanning part 142 is an optical system which performs horizontal scanning for scanning the image light in the horizontal direction for each scanning line of an image to be displayed. Further, the horizontal scanning part 142 includes an optical scanning element 142*a* (one example of a second optical scanning element) having a reflection mirror 142*b* such as a Galvano mirror, a horizontal drive circuit 142*c* which drives the optical scanning element 142*a*, and a swing detection circuit 142*d* which detects a swing state of the reflection mirror 142*b* of the optical scanning element 142*a*.

Further, the vertical scanning part 144 is an optical system which performs vertical scanning (one example of a secondary scanning) for scanning the image light in the vertical direction from a first horizontal scanning line toward a last horizontal scanning line for every 1 frame of the image to be displayed. Further, the vertical scanning part 144 includes an optical scanning element 144*a* (one example of first optical scanning element) having a reflection mirror 144*b* such as a Galvano mirror, and a vertical drive circuit 144*c* which drives the optical scanning element 144*a*.

Figure 6:
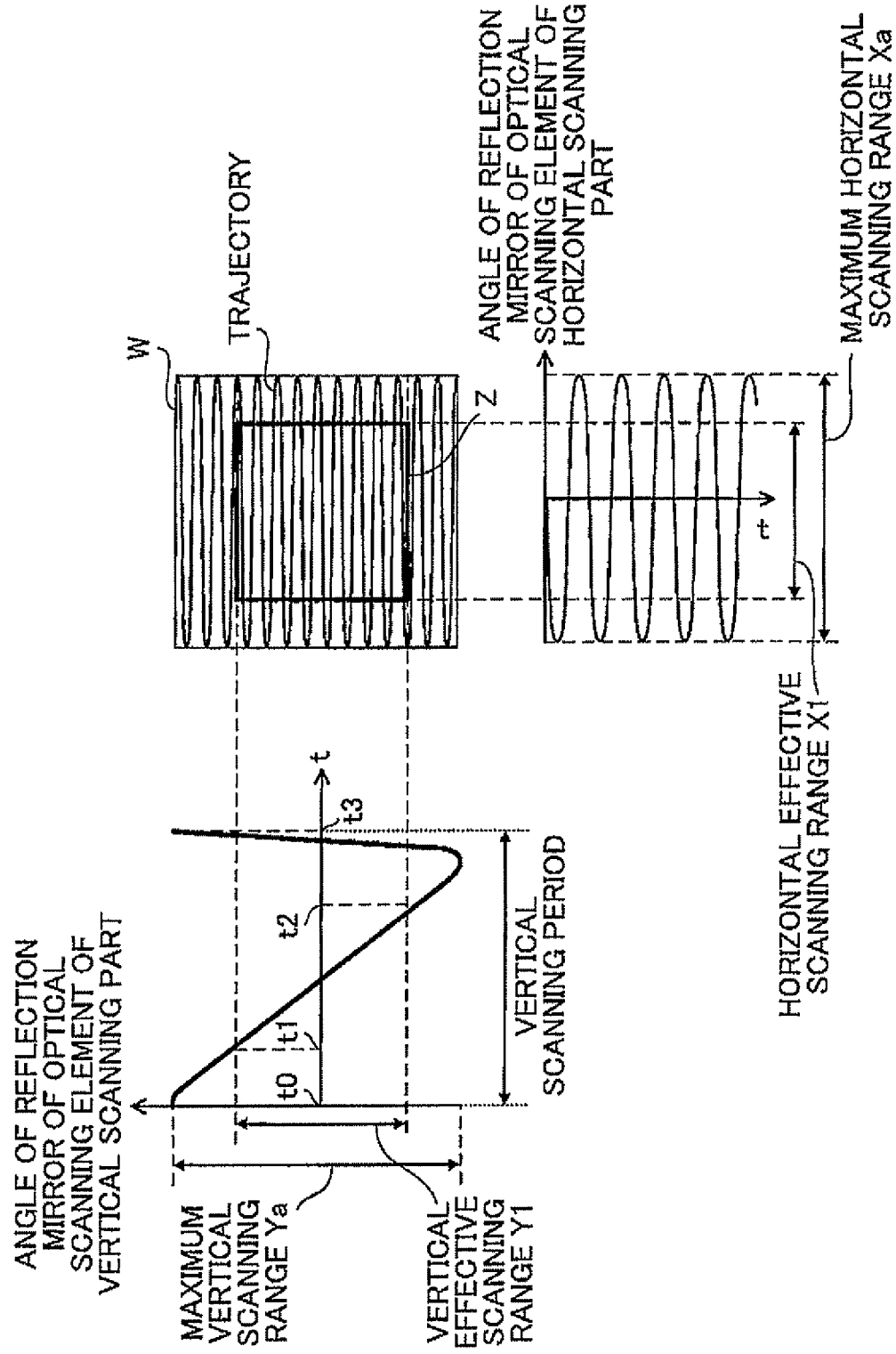
FIG. 6 is an explanatory view of an operation of a scanning part of the retinal scanning display.

FIG. 6 shows the relationship between a maximum scanning range W (a range defined by a maximum horizontal scanning range Xa and a maximum vertical scanning range Ya shown in FIG. 6) and an effective scanning range Z (a range defined by a horizontal effective scanning range X1 and a vertical effective scanning range Y1 shown in FIG. 6) both of which are obtained by the optical scanning element 142*a* of the horizontal scanning part 142 and the optical scanning element 144*a* of the vertical scanning part 144. Here, the "maximum scanning range" implies a maximum range where image light can be scanned by the optical scanning element 142*a* of the horizontal scanning part 142 and the optical scanning element 144*a* of the vertical scanning part 144.

The horizontal drive circuit 142*c* amplifies the horizontal drive signal 118 outputted from the horizontal drive signal generator 112, and supplies the amplified horizontal drive signal 118 to the optical scanning element 142*a* thus driving the reflection mirror 142*b* of the optical scanning element 142*a*. The vertical drive circuit 144*c* amplifies the vertical drive signal 119 outputted from the vertical drive signal generator 113, and supplies the amplified vertical drive signal 119 to the optical scanning element 144*a* thus driving the reflection mirror 144*b* of the optical scanning element 144*a*. The image light whose intensity is modulated in response to the video signal S is irradiated from the light irradiation part 120 at timing where the scanning position of the optical scanning element 142*a* and the scanning position of the optical scanning element 144*a* fall within the effective scanning range Z within the maximum scanning range W of the optical scanning element 142*a* and within the effective scanning range Z within the maximum scanning range W of the optical scanning element 144*a* respectively. Due to such processing, the image light is scanned within the effective scanning ranges Z by the optical scanning element 142a and the optical scanning element 144a respectively, and the image light for 1 frame is scanned within the effective scanning range Z. This scanning is repeated for every image of 1 frame. In FIG. 6, a trajectory γ of the image light to be scanned by the optical scanning element 142a and the optical scanning element 144a, assuming that the image light is constantly irradiated from the light irradiation part 120, is virtually shown. However, the number of scanning lines in the horizontal scanning direction X performed by the optical scanning element 142a is several hundreds to several thousands for every 1 frame so that the trajectory γ of the image light is described in a simplified manner in FIG. 6.

The explanation is made hereinafter in conjunction with FIG. 7 by mainly focusing on the constitution and the manner of operation of the vertical drive signal generator 113 which constitutes the technical feature of the retinal scanning display 100.

The vertical drive signal generator 113 is provided for generating a vertical drive signal 119 (see FIG. 5) which is a drive signal for forcibly driving the reflection mirror 144b of the optical scanning element 144a in a non-resonance mode and is acquired by subjecting a saw-tooth signal which changes linearly to low-pass filter processing and notch filter processing, and the vertical drive signal generator 113 has the following constitution. In this embodiment, Bessel low-pass filter processing is used as the low-pass filter processing applied to the saw-tooth signal which changes linearly. Further, the saw-tooth signal which changes linearly shifts a voltage value from a maximum level to a minimum level within a sufficiently short period compared to a period in which the saw-tooth signal shifts the voltage value from the minimum level to the maximum level.

Figure 7:
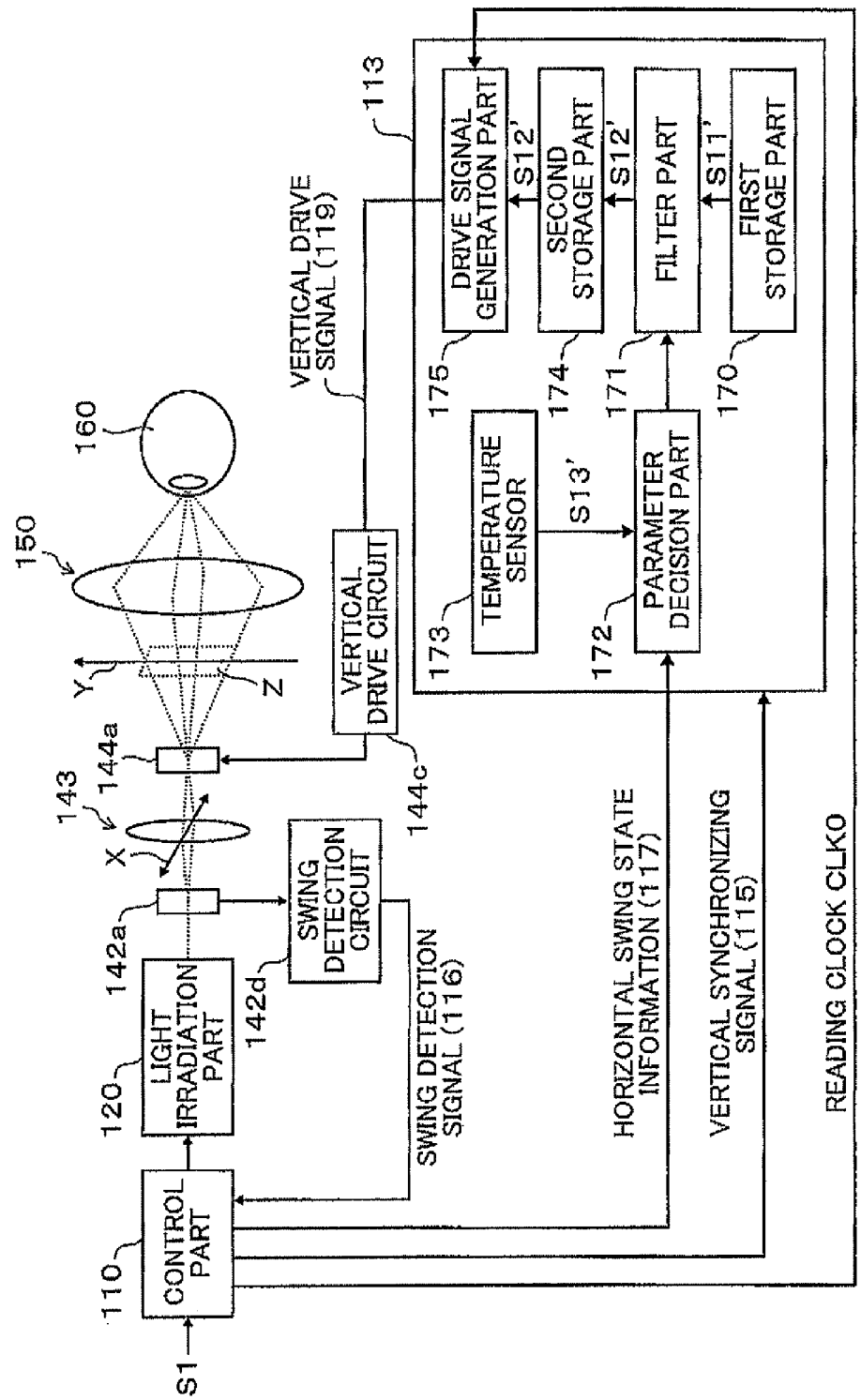
FIG. 7 is a constitutional view of a vertical drive signal generator of the retinal scanning display.

The vertical drive signal generator 113 includes, as shown in FIG. 7, a first storage part 170 (one example of a first storage unit), a filter part 171 (one example of a filter unit), a parameter decision part 172 (one example of a parameter decision unit), a temperature sensor 173 (one example of a temperature detection unit), a second storage part 174 (one example of a second storage unit), and a drive signal generation part 175 (one example of a drive signal generation unit).

In the first storage part 170, data related to a primary processing signal S11' which is acquired by subjecting a saw-tooth signal S10 to low-pass filter processing is prestored. For example, in the same manner as the above-mentioned optical scanning device 1, the primary processing signal S11' is generated by subjecting the saw-tooth signal S10 which changes linearly to the filter processing using a 18th-order low-pass filter. Further, the primary processing signal S11' is sampled at a predetermined sampling frequency, and is subjected to A/D conversion, and data obtained by the A/D conversion is prestored in the first storage part 170 as data related to the primary processing signal S11'.

Data related to the primary processing signal S11' stored in the first storage part 170 in this manner is read by the filter part 171. The filter part 171 generates a secondary processing signal S12' by subjecting the primary processing signal S11' to notch filter processing with a predetermined parameter.

Here, as resonance characteristics intrinsic to the optical scanning element 144a, assume that the first-order resonance is f1 [Hz], and second- and higher-order resonances are equal to or higher than f2(>f1) [Hz]. In this case, by attenuating frequencies equal to or higher than f2 [Hz] in the low-pass filter processing, it is possible to suppress the influence exerted on a drive signal by the second- and higher-order resonances among the resonance characteristics intrinsic to the optical scanning element 144a. Further, by attenuating the frequency around the frequency of f1 [Hz] in the notch filter processing, it is possible to suppress the influence exerted on the drive signal by the primary resonances among the resonance characteristics intrinsic to the optical scanning element 144a.

Further, in the same manner as the above-mentioned optical scanning element 1, the filter processing using the second-order notch filter is realized by calculation using the above-mentioned formula 1 and hence, the notch filter processing cannot be realized unless the order of numerator is equal to or more than the order of denominator. Accordingly, in the filter part 171, in addition to the second-order band-pass filter processing, second-order low-pass filter processing is performed. Accordingly, the secondary processing signal S12' becomes a signal acquired by subjecting the saw-tooth signal S10 to the 20th-order low-pass filter processing and secondary notch filter processing.

In this manner, the first-order resonance of the optical scanning element 144a is suppressed by the second-order notch filter processing and hence, linearity of the vertical drive signal 119 can be enhanced compared to a case where a cut-off frequency of the low-pass filter is set to f1 [Hz] or below.

Here, the parameter used in the filter part 171 is decided by the parameter decision part 172, and is inputted to the filter part 171. The parameter decision part 172 decides the parameter in the filter part 171 based on temperature detection information S13' outputted from the temperature sensor 173 arranged in the vicinity of the reflection mirror 144b of the optical scanning element 144a and horizontal swing state information 117 outputted from the control part 110.

The horizontal swing state information 117 is information proportional to a frequency of a drive signal for allowing the horizontal drive circuit 142c to drive the optical scanning element 142a (one example of a second drive signal), and is notified from the control part 110. The reason that the horizontal swing state information 117 is included in elements for deciding the parameter is that a reading clock CLK0 for outputting a vertical drive signal 119 from the drive signal generation part 175 changes. The horizontal scanning part 142 includes a swing detection circuit 142d for detecting a swing frequency of the optical scanning element 142a, and the control part 110 generates horizontal swing state information 117 based on information related to the swing frequency of the optical scanning element 142a notified from the swing detection circuit 142d, and notifies the horizontal swing state information 117 to the parameter decision part 172. The swing frequency of the optical scanning element 142a is equal to the frequency of the drive signal S20 for driving the optical scanning element 142a (see FIG. 5).

The reason that the temperature detection information S13' is included in elements for deciding the parameter is that the resonance characteristics (resonance frequencies f1, f2) intrinsic to the optical scanning element 144a change corresponding to the temperature of the optical scanning element 144a, and it is necessary to make the notch filter characteristic and the low-pass filter characteristic of the filter part 171 conform to the changed resonance characteristics. Further, the reason that horizontal swing state information 117 is included in elements for deciding the parameter is that it is necessary to change the frequency of the vertical drive signal 119 inputted to the optical scanning element 144a of the vertical scanning part 144 corresponding to the swing frequency of the optical scanning element 142a of the horizontal scanning part 142. That is, it is necessary to also change the vertical scanning frequency along with the change of the horizontal scanning frequency so that it is necessary to make the notch filter characteristic and the low-pass filter characteristic conform to the changed resonance characteristic. In particular, when the optical scanning element 142a is driven in a resonance mode and is subject to resonance oscillations, it is difficult to suppress the fluctuation of the oscillation frequency. In view of the above, it becomes highly necessary to change the frequency of the vertical drive signal 119 inputted to the optical scanning element 144a of the vertical scanning part 144 corresponding to the oscillation frequency of the optical scanning element 142a. The optical scanning element 142a usually performs scanning at a higher speed than the optical scanning element 144a.

In this embodiment, the parameter decision part 172 stores a first table where a temperature and frequencies f1', f2' are associated with each other and a second table where the horizontal swing state information 117 and an adjustment value of the parameter are associated with each other in an internal storage part (one example of a third storage part). Using these tables, the frequencies f1', f2' are decided based on temperature detection information S13' and the horizontal swing state information 117. The frequency f1' is the center frequency of the notch filter corresponding to the first-order resonance frequency f1, and the frequency f2' is the cut off frequency of the low-pass filter corresponding to the second-order resonance frequency f2. These frequencies f1', f2' are decided as parameters inputted to the filter part 171. Provided that the parameters can change the characteristic of the notch filter or the low-pass filter, the parameters are not always necessary to be information on the frequencies f1', f2' and may be other information.

The filter part 171, after generating the secondary processing signal S12' by subjecting the primary processing signal S11' to the notch filter processing and the low-pass filter processing as described above, stores data related to the secondary processing signal S12' in the second storage part 174.

The drive signal generation part 175 reads the data related to the secondary processing signal S12' from the second storage part 174 by a clock CLK0 having a predetermined frequency, and generates a vertical drive signal 119 by subjecting the data related to the secondary processing signal SIT to analog conversion using an internal D/A converter. Here, the clock CLK0 is a clock signal which is generated by the control part 110 and is notified to the drive signal generation part 175. The control part 110, based on the swing frequency of the optical scanning element 142a detected by the swing detection circuit 142d, generates the clock CLK0 and notifies the clock CLK0 to the drive signal generation part 175. Accordingly, even when it is necessary to change the vertical scanning frequency (frame frequency) in response to the change of the horizontal scanning frequency, it is unnecessary to change data related to the primary processing signal S11' which is stored in the first storage part 170 and hence, the increase of storage capacity can be suppressed.

Thereafter, the drive signal generation part 175 inputs the generated vertical drive signal 119 to the vertical drive circuit 144c, and the vertical drive circuit 144c inputs the vertical drive signal 119 to the optical scanning element 144a after amplification, and forcibly drives the reflection mirror 144b of the optical scanning element 144a in a non-resonance mode.

The drive signal generation part 175 is configured to output a plurality of saw-tooth vertical drive signals 119 by continuously repeating the processing where the data related to the primary processing signal S11' is read from the first storage part 170 and the vertical drive signal 119 is generated based on the data. Accordingly, image light irradiated from the light irradiation part 120 is continuously and repeatedly scanned in the vertical direction.

In this manner, the retinal scanning display 100 of this embodiment includes the vertical drive signal generator 113 which generates the vertical drive signal 119 which forcibly drives the reflection mirror 144b of the optical scanning element 144a in a non-resonance mode and is generated by subjecting the saw-tooth signal S10 to the low-pass filter processing and the notch filter processing.

Then, the vertical drive signal generator 113 prestores the data related to the primary processing signal S11' acquired by subjecting the saw-tooth signal S10 to the low-pass filter processing in the first storage part 170, and generates the secondary processing signal S12' by subjecting the primary processing signal S11' to the notch filter processing. Accordingly, it is possible to reduce a calculation time of the low-pass filter processing by the vertical drive signal generator 113. Particularly, it is possible to reduce a huge amount of calculation time which becomes necessary at the time of performing the high-order low-pass filter processing (for example, the above-mentioned 20th-order low-pass filter processing).

Further, the filter part 171 generates a secondary processing signal S12' by performing the notch filter processing using a parameter decided by the parameter decision part 172. Accordingly, notch filter processing in which the necessity of changing a parameter is high compared to the low-pass filter processing can be performed using a parameter which is changed when necessary. Further, by using a parameter corresponding to a resonance characteristic intrinsic to the optical scanning element 144a as the parameter which the parameter decision part 172 decides, even when there is the individual difference among resonance frequencies intrinsic to the optical scanning elements 144a, the notch filter processing can be performed corresponding to the individual differences among resonance frequencies.

By performing the notch filter processing by the filter part 171 in this manner, it is possible to realize the reduction of storage capacity of the first storage part 170. That is, when the data to which low-pass filter processing and notch filter processing are applied is prestored in a storage unit, it is necessary to provide data to which notch filter processing is applied with different parameters. However, according to this embodiment, notch filter processing is performed at the time of generating the vertical drive signal 119 and hence, it is possible to reduce an amount of data to be stored in the storage unit.

Further, by allowing the parameter decision part 172 to detect the resonance characteristic intrinsic to the optical scanning element 144a and to decide the parameter, an operation which becomes necessary at the time of exchanging the optical scanning element 144a such as a repair, an operation which becomes necessary at the time of the manufacture of the optical scanning device 1 or the like can be easily performed.

For example, a resonance detection signal generation part which inputs a sinusoidal signal to the optical scanning element 144a while changing a frequency of the sinusoidal signal is provided to the vertical drive signal generator 113. Then, the resonance detection signal generation part outputs the sinusoidal signal to the optical scanning element 144a while changing the frequency of the sinusoidal signal, and detects resonance frequencies f1, f2 by detecting a swing state of the reflection mirror 144b of the optical scanning element 144a by the parameter decision part 172. Here, the parameter decision part 172 detects a swing state of the reflection mirror 144b by inputting a swing detection signal 116 outputted from the swing detection circuit 142d or by detecting the displacement of a beam member which drives the reflection mirror 144b by a piezoelectric element or the like and by detecting a voltage generated by the piezoelectric element by the parameter decision part 172, and the parameter decision part 172 decides the parameter.

Further, the resonance characteristic intrinsic to the optical scanning element 144a varies corresponding to the temperature. Accordingly, a table in which the temperature and the resonance characteristic are associated with each other is provided. Accordingly, the resonance characteristic intrinsic to the optical scanning element 144a is detected in such a manner that temperature detection is performed by the temperature sensor 173, and the resonance characteristic is detected by performing the conversion on the table based on the detected temperature. Accordingly, even when the temperature changes, the optical scanning element 144a can properly perform the optical scanning.

Further, the vertical drive signal generator 113 includes a horizontal drive signal generator 112 which generates a horizontal drive signal 118 for driving an optical scanning element 142a which scans light in the horizontal direction intersecting with the scanning direction of the light scanning element 144a. The parameter decision part 172 decides parameters based on the horizontal swing state information 117, that is, based on the frequency of the drive signal S20. Accordingly, it is possible to make the notch filter characteristic and the low-pass filter characteristic conform to the change of the vertical scanning frequency, that is, the change of frequency of the vertical drive signal 119 which becomes necessary along with the change of the horizontal scanning frequency.

Although some embodiments of the present invention have been explained in detail based on drawings heretofore, the embodiments are provided only as examples and the present invention can be carried out in other modes with various modification and improvements based on the knowledge of those who are skilled in the art.

For example, when the resonance characteristic (particularly, second- and higher-order resonance frequency) intrinsic to the optical scanning element largely changes, data related to the primary processing signal to which low-pass filter processing is applied with some different parameters may be prepared. Then, the resonance characteristic intrinsic to the optical scanning element is detected, one primary processing signal is selected, and the filter processing is applied to the primary processing signal. By performing such processing, it is possible to properly perform the optical scanning even when the resonance characteristic intrinsic to the optical scanning element largely changes.

The invention claimed is:

1. A drive signal generator for generating a drive signal which is used for forcibly driving a reflection mirror of an optical scanning element in a non-resonance mode, and is generated by subjecting a saw-tooth signal to low-pass filter processing and notch filter processing, the drive signal generator comprising:
   a first storage unit which is configured to store data related to a primary processing signal acquired by subjecting the saw-tooth signal to the low-pass filter processing;
   a parameter decision unit which is configured to decide a parameter for the notch filter processing;
   a filter unit which is configured to read the primary processing signal from the first storage unit and to generate a secondary processing signal by subjecting the primary processing signal to the notch filter processing using the decided parameter;
   a second storage unit which is configured to store data related to the secondary processing signal generated by the filter unit; and
   a drive signal generation unit which is configured to read the data related to the secondary processing signal from the second storage unit by a clock having a predetermined frequency and to generate the drive signal by subjecting the data related to the secondary processing signal to analog conversion.

2. The drive signal generator according to claim 1, wherein the parameter which the parameter decision unit decides is a parameter corresponding to a resonance characteristic intrinsic to the optical scanning element.

3. The drive signal generator according to claim 2, wherein the parameter decision unit is configured to decide the parameter by detecting the resonance characteristic intrinsic to the optical scanning element.

4. The drive signal generator according to claim 1 further comprising:
   a temperature detection unit which is configured to detect an ambient temperature around the reflection mirror; and
   a third storage unit which is configured to store a table in which the parameter and the temperature are associated with each other, wherein
   the parameter decision unit is configured to determine the parameter corresponding to the temperature detected by the temperature detection unit based on the table stored in the third storage unit and to decide the parameter as the parameter for the notch filter processing.

5. The drive signal generator according to claim 1, wherein the filter unit is configured to generate the secondary processing signal by subjecting the primary processing signal to the low-pass filter processing in addition to the notch filter processing with the decided parameter.

6. The drive signal generator according to claim 1 further comprising:
   a second drive unit which is configured to generate a second drive signal for driving a second optical scanning element which scans light in a direction intersecting with a scanning direction of the optical scanning element, wherein
   the parameter decision unit is configured to decide the parameter based on a frequency of the second drive signal.

7. An optical scanning device comprising:
   an optical scanning element which is configured to scan light in a predetermined scanning direction;
   a second optical scanning element which is configured to scan the light in a direction which intersects with the scanning direction of the optical scanning element; and
   a drive signal generator for generating a drive signal which is used for forcibly driving a reflection mirror of the optical scanning element in a non-resonance mode, and is generated by subjecting a saw-tooth signal to low-pass filter processing and notch filter processing, wherein
   the drive signal generator comprises:
   a first storage unit which is configured to store data related to a primary processing signal acquired by subjecting the saw-tooth signal to the low-pass filter processing;
   a parameter decision unit which is configured to decide a parameter for the notch filter processing;
   a filter unit which is configured to read the primary processing signal from the first storage unit and to generate a secondary processing signal by subjecting the primary processing signal to the notch filter processing using the decided parameter;

a second storage unit which is configured to store data related to the secondary processing signal generated by the filter unit; and a drive signal generation unit which is configured to read the data related to the secondary processing signal from the second storage unit by a clock having a predetermined frequency and to generate the drive signal by subjecting the data related to the secondary processing signal to analog conversion.

8. An image display device comprising:

a light irradiation part which is configured to irradiate an image light modulated corresponding to an image signal; and an optical scanning device which is configured to scan the image light irradiated from the light irradiation part, the image display device displaying an image by scanning the image light irradiated from the light irradiation part by the optical scanning device, wherein the optical scanning device comprises:

an optical scanning element which is configured to scan the image light in a predetermined scanning direction;

a second optical scanning element which is configured to scan the image light in a direction which intersects with the scanning direction of the optical scanning element; and a drive signal generator for generating a drive signal which is used for forcibly driving a reflection mirror of the optical scanning element in a non-resonance mode, and is generated by subjecting a saw-tooth signal to low-pass filter processing and notch filter processing, and the drive signal generator comprises:

a first storage unit which is configured to store data related to a primary processing signal acquired by subjecting the saw-tooth signal to the low-pass filter processing;

a parameter decision unit which is configured to decide a parameter for the notch filter processing;

a filter unit which is configured to read the primary processing signal from the first storage unit and to generate a secondary processing signal by subjecting the primary processing signal to the notch filter processing using the decided parameter;

a second storage unit which is configured to store data related to the secondary processing signal generated by the filter unit; and a drive signal generation unit which is configured to read the data related to the secondary processing signal from the second storage unit by a clock having a predetermined frequency and to generate the drive signal by subjecting the data related to the secondary processing signal to analog conversion.

9. The image display device according to claim 8 further comprising:

a projection optical system which is configured to display the image by projecting the image light scanned by the optical scanning device onto a retina of at least one eye of a user.

\* \* \* \* \*